United States Patent Office 3,505,100
Patented Apr. 7, 1970

3,505,100
ELASTOMER-COATED FIBROUS GLASS
Byron M. Vanderbilt, Scotch Plains, and Robert E. Clayton, Westfield, N.J., assignors to Esso Research and Engineering Company, a corporation of Delaware
No Drawing. Continuation-in-part of application Ser. No. 639,628, May 19, 1967. This application May 10, 1968, Ser. No. 728,316
Int. Cl. B32b *17/04, 25/02;* B44d *1/092*
U.S. Cl. 117—76                                                     6 Claims

ABSTRACT OF THE DISCLOSURE

Fibrous glass reinforced elastomers are prepared by treating the fibrous glass with an organosilicon compound in which the stable organic group attached to the silicon atom contains an amino group, and thereafter contacting the treated fibrous glass with an elastomer compound comprising a sulfur-curable elastomer containing suitable curatives and substantially no zinc oxide or free fatty acids; the composite is cured at elevated temperatures.

SUMMARY OF INVENTION

The invention relates to a method for preparing fibrous glass-reinforced elastomers. More particularly, this invention is concerned with fibrous glass whose surfaces have been treated with a hydrolyzed organosilicon compound such as gamma-aminopropyl triethoxy silane and thereafter contacted (preferably in the form of a coating) with a compound which contains an unsaturated elastomer and substantially no zinc oxide or free fatty acids. The resultant fibrous glass (with or without an elastomer coating) is thereafter contacted with a matrix of the rubber of choice, which matrix contains at least one curing agent suitable for the rubber, and the resultant composite is cured at elevated temperatures.

This application is a continuation-in-part of our prior copending application, S.N. 639,628, filed May 19, 1967, which is a continuation-in-part of our prior copending applications S.N. 423,372, filed Jan. 4, 1965, and now Patent 3,376,188 and S.N. 392,027, filed Aug. 25, 1964, which latter application is in turn a continuation-in-part of our abandoned applications S.N. 120,911, filed June 30, 1961, and S.N. 138,420, filed Sept. 15, 1961, which latter abandoned application is in turn a continuation-in-part of our earlier application, S.N. 30,089, filed May 19, 1960, and now forfeited.

The invention described in copending application S.N. 639,628 mentioned above relates to the preparation of elastomer-coated fibrous glass and its use in the reinforcement of rubbers by treating the fibrous glass surfaces with an organosilicon compound in which at least one organic group attached to the silicon atom by a carbon-silicon linkage contains an amino group and thereafter coating the treated fibrous glass with an elastomer compound containing an unsaturated elastomer and curing agents such as sulfur and sulfur accelerators together with curing adjuvants such as zinc oxide and free fatty acids such as stearic acid.

It has unexpectedly now been found that zinc oxide, a curing adjuvant considered essential by those skilled in the art in conjunction with unsaturated elastomers and sulfur-type cure systems, interferes with the bonding relationship established between the fibrous glass and the unsaturated elastomer through the organosilicon compound in which the organic group attached to the silicon atom contains an amino group. While we are not restricted to this theory insofar as the scope of this invention is concerned, it is believed that the zinc complexes with the amine moiety of the organosilicon compound and thus markedly reduces its efficiency in bringing about a bonding of fibrous glass to unsaturated elastomers.

It has also unexpectedly been found that free fatty acids, normally employed in sulfur-type cure systems for unsaturated elastomers, also interfere with the efficiency of the amino-organosilicon compound in bringing about a bonding of the fibrous glass to unsaturated elastomers. It is believed that the free fatty acids, because of their acidity, reduce the efficiency of the aminosilane by combination of the carboxyl group of the free fatty acid with the amine moiety of the organosilicon compound.

The "fibrous glass" employed in this invention includes parallel and twisted glass monofilaments, strands, yarns, rovings, mats, staple yarns, woven fabrics, woven rovings, cord, chopped rovings, and the like.

In the first step of this invention, the fibrous glass surfaces are treated with a liquid composition containing an organosilicon compound in which at least one of the organic groups attached to the silicon by a carbon linkage contains an amino group. Thus, the organosilicon compounds useful in this invention include aminosilanes, their corresponding silanols (i.e. their partially or fully hydrolyzed forms of the silane) and their corresponding polysiloxanes (i.e. polymeric forms of the silanols) as well as mixtures of the silane, silanols and siloxanes.

The aminosilanes have the general formula:

wherein Y is a $C_2$–$C_8$ alkyl, isoalkyl or cycloalkyl radical which contains at least one amino group; X is selected from the group consisting of a halogen, hydroxyl, alkoxy, and acyloxy group; $R_1$ and $R_2$ are selected independently from the group consisting of Y, X and methyl. The Y group may also contain more than one amino group as long as no single carbon atom holds more than one such group. Condensation products of the aminosilanes are also applicable. Specific suitable compounds within this structure are as follows: gamma-aminopropyl triethoxy silane, beta-aminoethyl triethoxy silane, gamma-aminopropyl trimethoxy silane, di(gamma-aminopropyl) diethoxy silane, tri(gamma-aminopropyl) ethoxy silane, gamma-aminopropyl silane ester of the monomethyl ether of ethylene glycol, gamma-aminopropyl dimethyl ethoxy silane, beta-aminopropyl triethoxy silane, N-beta-aminoethyl-gamma-aminopropyl trimethoxy silane, the corresponding silanols, e.g. gamma-aminopropyl silanol or their condensation products (siloxanes).

The aminosilanes are effectively applied to the fibrous glass surfaces in liquid form, i.e. as solutions or emulsions in water, in $C_4$–$C_{16}$ hydrocarbon solvents such as pentane, hexane, heptane, benzene, toluene, xylene, etc., or in organic solvents such as $C_2$–$C_6$ alkanols (e.g. isopropyl alcohol, sec.-butyl alcohol, etc.), $C_3$–$C_8$ ketones (e.g. acetone, methylethyl ketone, etc.) and chlorinated alkanes such as carbon tetrachloride, chloroform and ethylene dichloride. For the purpose of convenience herein and in the appended claims, the term "silane" will be understood to include the unhydrolyzed form (i.e. the silane), the partially or fully hydrolyzed form (i.e. the silanol), the condensation products resulting from the partially or fully hydrolyzed form of the silane (i.e. the siloxane, also known as polysiloxane), and mixtures of the aforesaid forms. If desired, the liquid composition containing the silane may also contain binders, sizing agents and/or lubricants as long as these are chosen so as not to interfere with the subsequent action of the silane bonding to the elastomer coating or rubber matrix.

The liquid composition containing 0.1–5 wt. percent, preferably 0.3–2 wt. percent of the silane is applied to the surface of the fibrous glass. This treatment step is preferably carried out on glass monofilaments as they emerge from the glass spinnerets, but may also be carried out on a plurality of monofilaments (i.e. a strand), a plurality of strands (i.e. a yarn), woven glass cloth or any of the other forms of fibrous glass are treated with the liquid composition containing the silane for a fraction of a second to 60 minutes at temperatures up to 200° F. so as to deposit at least a monomolecular layer, preferably a layer of 10–40 molecules thick, of the silane on the fibrous glass surface. This silane layer generally corresponds to a deposit of from about 0.05 to about 2.0 wt. percent, preferably 0.1 to 1.0 wt. percent, of the silane, based on the weight of the fibrous glass.

The method of applying the liquid composition containing the silane on the fibrous glass surfaces is not critical. The silane may be applied by wiping the liquid composition onto the fibrous glass or by other conventional coating methods, e.g. spray coating, roller coating, flow coating, etc.

The silane-treated fibrous glass may be immediately used as is for the second step described below or is washed with some of the water or hydrocarbon solvents or organic solvents disclosed above. Preferably, the silane-treated fibrous glass is dried, prior to the second step, to remove substantially all of the diluent or solvent employed in the liquid composition containing the silane. Air drying at room temperature for 10 minutes to 48 hours or oven drying at temperatures of up to 300° F. for 10 seconds to 12 hours will usually suffice to evaporate off any diluent or solvent and set the silane to the glass surface.

In the second step for preparing fibrous glass-reinforced elastomers, the silane-treated fibrous glass is subsequently contacted with an elastomer compound. The elastomer compound may be in the form of a liquid composition. When it is desired to prepare fibrous glass-reinforced elastomers in which the fibrous glass will undergo relatively little flexing, the elastomer compound may be contacted with the fibrous glass in the form of a solid article, i.e. sheets, slabs, strips, etc. When it is desired to prepare fibrous glass-reinforced elastomers in which the glass fiber will undergo a significant amount of flexing, the elastomer compound is preferably contacted with the silane-treated fibrous glass in the form of a liquid composition. Such liquid composition may in turn take the form of an aqueous emulsion, organic solvent solution (using a solvent mentioned hereinabove), a plastisol, an organosol, a dispersion, a cement or latex. Generally, when using such liquid compositions, the elastomer compound will be present in an amount ranging from about 5 to about 30%, preferably 10 to 20%, based on the weight of the total liquid composition.

The elastomer compound contains the sulfur-curable (i.e. an unsaturated) elastomer, together with sulfur, at least one conventional accelerator, and if desired, conventional elastomer pigments, stabilizers, plasticizers, fillers, antioxidants, extender oils, carbon blacks, and the like. The sulfur-curable elastomer is generally present in an amount of about 40 to about 95%, preferably 60 to 75% of the weight of the total elastomer compound.

The sulfur-curable elastomer, i.e. unsaturated elastomer, may be a natural or synthetic elastomeric polymer containing at least two double bonds per molecule. These include natural rubber, ethylene-alpha-olefin-diolefin terpolymers (EPDMs) such as ethylene-propylene-cyclopentadiene, ethylene-propylene-hexadiene, ethylene-propylene-methylene norbornene, etc.; styrene-butadiene copolymers (SBR); butadiene acrylonitrile copolymers (NBR); polybutadienes; polyisoprenes; polychloroprenes ("Neoprenes"); butyl rubbers; chlorinated or brominated butyl rubbers and the like. Mixtures of two or more of these elastomers may also be used.

The elastomer compound also contains 0 to 5 parts, preferably 1 to 3 parts, per 100 parts of elastomer, of sulfur, as well as about 0 to about 3 parts, preferably 0.5 to 1.5 parts, per 100 parts of the elastomer, of at least one conventional vulcanization accelerator. These vulcanization accelerators are well known in the prior art and include materials such as aldehyde amines, thiocarbamates, thiuram sulfides, guanidines, thiazoles, and the like. Nonlimiting, suitable examples of specific accelerators include diphenyl guanidine, di-o-tolyl guanidine, thiocarbanilide, mercaptobenzothiazole, tetramethyl thiuram disulfide, N-oxy-diethylene benzothiazole-2-sulfenamide, benzothiazole disulfide, N-tert.-butyl-2-benzothiazole sulfenamide, and the like.

If the elastomer compound is utilized in the form of a liquid composition, such liquid composition may be applied to the silane-treated fibrous glass in a manner similar to those described hereinabove for the treatment of the fibrous glass with the liquid composition containing the silane. After treatment of the silane-treated fibrous glass with the liquid composition containing the elastomer, the resultant product is preferably dried to remove substantially all of any diluent or solvent used in applying the silane and elastomer. Drying may take place in air at room temperature for 5 minutes to 48 hours or more; alternatively, the resultant elastomer-coated fibrous glass may be passed through a drying oven held at temperatures of 100° F. to 1000° F. with residence times of 5 seconds to several minutes. In general, the drying conditions may vary considerably, depending on the types and amounts of diluents or solvents used as well as the thickness of the elastomer coatings. When highly non-tacky elastomeric coatings are employed, the coated fibrous glass may be wound up or spooled and the drying carried out on a batch basis at 200–250° F.

The elastomer compound may or may not contain sulfur and sulfur-type curatives depending upon two factors: if the elastomer compound is contacted with the silane-treated fibrous glass in a solid form (i.e. slabs, strips, etc.), it should contain curatives of the type and amounts mentioned above so that a substantially complete cure of the fibrous glass-elastomer compound composite will occur upon heating at elevated temperatures. If, on the other hand, the elastomer compound to be contacted with the silane-treated fibrous glass is in the form of a liquid composition, it need not (but preferably does) contain sulfur and sulfur-type curatives of the types and amounts mentioned above. This follows from the fact that when the elastomer compound is present in the form of a liquid composition, it results in the deposition of an elastomer coating on the silane-treated fibrous glass surfaces and the elastomer-coated fibrous glass must then be contacted with a rubber matrix which contains suitable curatives. Since migration of the curatives from the rubber matrix takes place during heating of the elastomer-coated fibrous glass-rubber matrix composite, it is not absolutely necessary that the elastomer compound contain curing agents.

If the elastomer compound is employed in the form of a liquid composition and if such liquid composition also contains curing agents, the resultant elastomer-coated fibrous glass may be dried at such temperatures and times so as to produce a substantially complete cure of the elastomer; generally, heating at 200 to 1500° F. for 5 seconds to 5 hours or more, depending on the curing agent, elastomer of choice and whether the curing is done before or after the coated fibrous glass is wound up or spooled, will suffice to obtain a substantially complete cure of the elastomer.

Preferably, the elastomer-coated fibrous glass is dried at such temperatures and times so as to produce no cure or only a partial cure of the elastomer. Particularly good results, as regards the reinforcement of rubbers, are obtained if the elastomer-coated fibrous glass is dried under relatively mild conditions such that the elastomer undergoes no cure or only a slight cure.

Where the elastomer compound is employed in solid form, bonding between the silane-treated fibrous glass and the elastomer compound (which will contain sulfur and sulfur-type curatives) will occur by maintaining the elastomer compound in contact with the silane-treated fibrous glass and heating the composite at a temperature and for a period of time sufficient to bring about a substantially complete cure of the elastomer, e.g. 250°–400° F., preferably 280°–330° F., for about 5 to about 120 minutes, preferably 10–45 minutes, under pressures of about 5 to about 1000 p.s.i.g., preferably 50–600 p.s.i.g.

When the elastomer compound is employed in the form of a liquid composition and the liquid composition thereafter is used to treat the silane-treated fibrous glass and subjected to drying as mentioned above, the dried uncured, partially cured or substantially fully cured elastomer-coated fibrous glass may then be used for the reinforcement of natural or synthetic rubbers. The natural or synthetic rubbers to be reinforced must contain about 0.2 to 10 parts or more, per 100 parts of the rubber, of at least one curing agent for the rubber of choice. These curing agents are well known in the prior art and include materials such as sulfur, tellurium, selenium, peroxides, sulfur-type compounds, accelerators, quinones, dioximes, metal oxides, phenol-aldehyde resins, etc. If desired, the rubber to be reinforced may also be compounded with conventional adjuvants such as silica fillers, clay fillers, carbon blacks, extender oils, plasticizers, metal oxides, fatty acids, stabilizers, antioxidants, coloring agents, flame inhibitors, resins, etc.

Reinforcement of the desired natural or synthetic rubber takes place by contacting the dried elastomer-coated fibrous glass with the rubber to be reinforced either contiguously or intermingled in conventional vulcanizing equipment and curing the resultant elastomer-coated fibrous glass-rubber composite at a temperature of about 250–400° F., preferably 280°–330° F., for about 5 to about 120 minutes, preferably 10–45 minutes, under pressures of about 5 to about 1000 p.s.i.g., preferably 50–600 p.s.i.g.

The rubber to be reinforced may be any of those referred to hereinbefore as an "elastomer" for use as the coating on the silane-treated fibrous glass. However, it should be understood that the rubber to be reinforced need not necessarily be the same polymer as that chosen for the elastomer coating. Once the surfaces of the fibrous glass have been substantially coated with the elastomer as described above, the chemistry which occurs during the reinforcement process is that involved in the bonding of two same or dissimilar rubbers to each other. Without being restricted to any theory, it is believed that during the reinforcement process (which takes place at elevated temperatures) any curing agent present in the elastomer coating serves to enhance the bond between the silane-treated glass and the elastomer coating. Simultaneously, the curing agent present in the rubber to be reinforced, as well as any curing agent in the elastomer coating, causes a tight bond between the rubber and the elastomer top coating on the fibrous glass. Although it is preferable that the elastomer coating on the fibrous glass contain at least one curing agent for said elastomer, good results are nevertheless obtained from the use of an elastomer coating which contains no curing agent since sufficient curing agent will generally migrate from the rubber to be reinforced to the elastomer coating (during the reinforcing process) to cause an adequate cure of the elastomer coating. It is to be recognized by those skilled in the art that the rubber to be reinforced and/or the elastomer which forms the top coating on the fibrous glass are generally selected on the basis of their known compatibility with each other and the curing system is generally one which has been proven to be effective for bonding the selected rubber to be reinforced to the selected elastomer top coating on the fibrous glass.

The crux of this invention lies in the discovery that the elastomer compound which forms the coating on the amino-organosilicon-treated fibrous glass must be substantially free of zinc oxide and free fatty acids. The term "free fatty acids," as employed herein, is intended to distinguish between the acidic form of the free fatty acids and the esterified or salt form of free fatty acids; it has been found that the esterified or salt form of the fatty acids does not interfere with the bonding brought about by the amino-organosilicon compound.

In general, the amount of zinc oxide present in an elastomer compound should be such that the total amount of combined zinc will be present in less than about 0.1, preferably less than 0.05, part per 100 parts of elastomer. Free fatty acids can be tolerated in a maximum amount of about 1, preferably no greater than 0.5, parts per 100 parts of the elastomer.

Zinc oxide is not normally present in elastomers and consequently, its presence can be readily avoided by not compounding the elastomer with zinc oxide (the normal procedure is that when elastomers are to be cured with a sulfur-type curing system, the elastomers are deliberately compounded with zinc oxide). On the other hand elastomers prepared by emulsion polymerization (e.g. styrene-butadiene rubber, butadiene-acrylonitrile rubber, etc.) normally contain undesirable amounts of fatty acids such as stearic acid, palmitic acid, rosin acids (rosin acids primarily consist of abietic acid), etc.

In the case where the elastomer desired to be used for the elastomer coating is one which, as received, contains significant amounts of free fatty acids, such fatty acids can be readily removed by washing the elastomer with a solution of an alkaline reagent, preferably an 0.5–5.0% aqueous solution, of an alkali metal hydroxide, such as sodium or potassium hydroxide, and thereafter washing the elastomer with water to remove the water-soluble soaps and residual alkali metal hydroxide. This operation is preferably carried out on a roller mill equipped with one corrugated roll. However, slurry washing of the coagulated rubber in the form of crumbs may also be employed.

When compounding the washed and dried elastomer, it has been found that further enhancement of the bonding of the sulfur cured elastomer to the aminosilane-treated glass can be accomplished by including in the compound an alkaline material to neutralize any free fatty acid remaining in the rubber.

Amines containing the aromatic nucleus are not desirable since they are not sufficiently alkaline and consequently, mono-, di- and tri-alkyl and cycloalkyl amines should be used. Of these various types of amines, the tri-alkyl amines are preferred over the di-alkyl and mono-alkyl types since the hydrogen atoms attached to the amine nitrogen atom may react with the rubber curing agents. Moreover, tri-alkyl amines are preferred over inorganic alkali, such as magnesia which is a common rubber compounding ingredient, since such inorganic oxides may bond themselves to, or even react with, the glass surface. Particularly preferred tri-alkyl amines are those containing 6 to 16 carbon atoms such as dodecyl dimethyl amine. The amines should be used in an amount ranging from about 0.5 to about 1.5, preferably 0.8–1.2, equivalents per equivalent of free fatty acid present in the elastomer.

Although it is preferred to remove the bulk of the free fatty acids by conversion to water-soluble soaps and subsequently removing them by water washing, neutralization of the free fatty acids with a trialkylamine by compounding may suffice in many cases. Thus, either washing alone or neutralization, or both, may be used so long as the maximum amount of free fatty acid present in the elastomer, prior to its use in coating the amino-organosilicon-treated fibrous glass is limited to that amount set forth hereinabove.

The rubber matrix which is to be reinforced with the elastomer-coated fibrous glass may, however, contain conventional amounts of zinc oxide and/or free fatty acids. This follows from the fact that the elastomer on the amino-organosilicon-treated fibrous glass acts as a barrier to any interaction between the amino organosilicon compound on the fibrous glass surfaces and any zinc oxide or free fatty acid present in the rubber to be reinforced.

The elastomer-coated fibrous glass, particularly if a yarn is twisted and especially if such yarns are plied to form cords, are advantageously employed in the preparation of reinforced hoses, belts, tires, etc. For example, tires reinforced with the elastomer-coated fibrous glass of the present invention are stronger, more durable, more dimensionally stable, more resistant to heat than conventional tires or tires in which the rubber is reinforced with the aid of an amino-organosilicon compound-treated fibrous glass containing an elastomer coating which has been compounded with zinc oxide and/or free fatty acids in contact with the rubber to be reinforced.

The following examples are submitted to illustrate the present invention. Unless otherwise indicated, all parts and percentages in the specification are based upon weight.

EXAMPLE 1

Commercial styrene-butadiene rubber containing about 23.5% bound styrene was washed twice with an equal volume of 5% sodium hydroxide in a kneader followed by contacting twice with an equal volume of distilled water. Excessive water was removed by drying in a vacuum oven at 200° F. and the drying completed by milling on a warm roller mill. After this washing, it was found that the styrene-butadiene rubber contained volatile matter of 0.11%, ash of 0.34%, organic acid of 0.35% maximum, soap of 0.10% and had a Mooney viscosity (ML-4 at 212° F.) of 44. The acid was calculated as stearic acid and the soap as sodium stearate. The resultant styrene-butadiene elastomer was then compounded with the materials set forth in Table 1.

TABLE I

|  | Compound | | |
| --- | --- | --- | --- |
|  | 1 | 2 | 3 |
| Washed styrene-butadiene elastomer | 100 | 100 | 100 |
| Dodecyl dimethyl amine | 0.31 | | |
| SRF black | 50 | 50 | 50 |
| Dibutyl phthalate | 5 | 5 | 5 |
| Santocure NS* | 0.4 | 0.4 | 0.4 |
| Sulfur | 2.5 | 2.5 | 2.5 |
| Zinc oxide | | | 5.0 |
| Stearic acid | | | 0.65 |

*Santocure NS is N-tert.-butyl-2-benzothiazole sulfenamide.

Heat cleaned glass cloth of HG-28 weave was treated with a 1.4% aqueous solution of gamma-aminopropyl triethoxy silane, air dried, and then heated in an air oven at 200° F. for one-half hour. Sandwich type constructions were than prepared using this glass in between sheets of each of the three SBR compounds listed in Table I.

The elastomer-fibrous glass composites were then subjected to strip adhesion tests and the following results were obtained:

TABLE II

|  | Compound | | | | | |
| --- | --- | --- | --- | --- | --- | --- |
|  | 1 | | 2 | | 3 | |
| Minutes of cure at 292° F | 30 | 45 | 30 | 45 | 30 | 45 |
| Adhesion, lb./in.: | | | | | | |
| At room temperature | 112 | (¹) | 100 | 100 | 30 | 22 |
| At 250° F | 42 | 50 | (¹) | 32 | 25 | 11 |

¹ Glass damaged, no true reading obtained.

The results shown in Table II clearly indicate that an elastomer compounded in the conventional manner with zinc oxide and a free fatty acid such as stearic acid adheres poorly to aminosilane-treated fibrous glass (Compound 3), whereas an elastomer which contains no zinc oxide and a reduced amount of stearic acid shows excellent adhesion results (Compound 2). The adhesion results are even more improved when the stearic acid is diminished by a combination of washing and neutralization with a tri-alkyl amine (Compound 1).

EXAMPLE 2

Heat cleaned glass cloth of HG-28 weave was treated with an aqueous emulsion comprising 1.4% of gamma-aminopropyl triethoxy silane, 1% of polymerized 1,2-dihydro-2,2,4-trimethyl quinoline and 5% of a styrene-butadiene resin (as a sizing agent) of approximately 15,000 molecular weight and containing about 30 mole % styrene (this resin was prepared by butyllithium catalysis). The treated glass cloth was thereafter dried at room temperature followed by heating in an air oven for a period of two hours at 150° F. Strip adhesion tests were then run using the elastomer compounds listed in Table I in the manner set forth in Example 1. The results of these adhesion tests using the glass cloth sized in a simulated manner as glass strands are shown in Table III:

TABLE III

|  | Compound | | | | | |
| --- | --- | --- | --- | --- | --- | --- |
|  | 1 | | 2 | | 3 | |
| Minutes of cure at 292° F | 30 | 45 | 30 | 45 | 30 | 45 |
| Adhesion, lb./in.: | | | | | | |
| At room temperature | (¹) | 97 | 82 | 120 | 34 | 23 |
| At 250° F | 36 | 56 | (¹) | 25 | 8 | 4 |

¹ Glass damage, no true reading obtained.

These data show that glass fibers coated with a compatible sizing containing an aminosilane, also show improved bonding to sulfur cured rubber compounds containing no zinc oxide and of low fatty acid content.

EXAMPLE 3

Heat cleaned glass cloth of HG-28 weave was treated with the silane, quinoline compound and styrene-butadiene resin in the manner set forth in Example 2 and tested with an elastomer compound similar to Compound 3 of Example 1, except that the zinc oxide was omitted from this compound.

This compound was tested in the strip adhesion test using the sized glass to give the results set forth in Table IV:

Table IV

Minutes of cure at 292° F _____ 45
Adhesion, lb./in.:
  At room temperature _____ 70
  At 250° F _____ 19

These test data show that free fatty acid is harmful to the bonding of a sulfur cured rubber to glass containing an aminosilane coating, although not as deleterious as a combination of zinc oxide and a fatty acid.

EXAMPLE 4

Heat cleaned glass cloth of HG-28 weave was dip-coated with a methyl ethyl ketone solution containing 1.4% of ⅓ hydrolyzed gamma-aminopropyl triethoxy silane and thereafter dried at 200° F. in an oven after allowing the methyl ethyl ketone solvent to evaporate at room temperature. The treated glass cloth was thereafter tested with the compounds set forth in Table V in accordance with the procedure described in Example 1:

TABLE V

|  | Compound | | | | |
| --- | --- | --- | --- | --- | --- |
|  | 4 | 5 | 6 | 7 | 8 |
| Styrene-butadiene elastomer* | 100 | 100 | 100 | 100 | 100 |
| Dodecyl dimethyl amine | | 0.15 | 0.3 | 0.6 | 1.2 |
| SRF black | 50 | 50 | 50 | 50 | 50 |
| Dibutyl phthalate | 5 | 5 | 5 | 5 | 5 |
| Santocure NS | 0.4 | 0.4 | 0.4 | 0.4 | 0.4 |
| Sulfur | 2.5 | 2.5 | 2.5 | 2.5 | 2.5 |

*Washed as described in Example 1.

Cures and test data for elastomer compounds 4–8 are set forth in Table VI.

TABLE VI

| | Compound | | | | |
|---|---|---|---|---|---|
| | 4 | 5 | 6 | 7 | 8 |
| Adhesions at room temperature: | | | | | |
| Cure condition 45' at 292° F. adhesion, lb./in | 100 | 134 | 90 | 40 | 36 |
| Cure condition 45' at 302° F. adhesion, lb./in | 66 | 116 | 80 | | |
| Adhesions at 250° F.: | | | | | |
| Cure condition 45' at 292° F. adhesion, lb./in | 19 | 42 | 28 | | |
| Cure condition 45' at 302° F. adhesion, lb./in | 39 | 50 | 41 | | |

The results in Table VI indicate that it is desirable to have any residual free fatty acid remaining after washing of the elastomer neutralized with only an approximate equivalent amount of the amine, but that an excess of the amine should not be used.

It is to be understood that this invention is not limited to the specific examples which have been offered merely as illustrations and that modifications may be made without departing from the spirit of the invention.

What is claimed is:

1. Fibrous glass-reinforced elastomer comprising:
   (a) fibrous glass whose surfaces contain an initial coating of an organosilicon compound in which the organic group attached to the silicon atom contains an amino group, said coated fibrous glass in contact with
   (b) an elastomer compound which contains
      (1) a sulfur-curable elastomer containing less than 0.05 part of zinc oxide and less than 0.5 part of free fatty acids, per 100 parts of elastomer, and
      (2) a curing agent consisting essentially of up to 5 parts of sulfur and up to 3 parts of a vulcanization accelerator, per 100 parts of the sulfur-curable elastomer.

2. The fibrous glass-reinforced elastomer of claim 1 in which the organosilicon compound is selected from the group consisting of gamma-aminopropyl triethoxy silane, its corresponding silanol and its corresponding siloxane.

3. A process for preparing fibrous glass-reinforced rubber which comprises:
   (A) preparing an elastomer coated fibrous glass by:
      (1) treating the surfaces of fibrous glass so as to deposit thereon an initial coating of an organosilicon compound in which the organic group attached to the silicon atom contains an amino group; and
      (2) treating the organosilicon-treated fibrous glass so as to deposit thereon a second coating of an elastomer compound which contains
         (a) a sulfur-curable elastomer containing less than 0.05 part of zinc oxide and less than 0.5 part of free fatty acids, per 100 parts of elastomer; and
         (b) a curing agent consisting essentially of up to 5 parts of sulfur and up to 3 parts of a vulcanization accelerator, per 100 parts of the sulfur-curable elastomer; and
   (B) contacting the elastomer-coated fibrous glass with a curable rubber desired to be reinforced, said rubber containing agents suitable for curing the rubber; and
   (C) heating the composite from step (B) at a temperature and for a period of time sufficient to effect a substantially complete cure of the rubber.

4. The process of claim 3 in which the organosilicon compound is selected from the group consisting of gamma-aminopropyl triethoxy silane, its corresponding silanol and its corresponding siloxane.

5. Fibrous glass-reinforced rubber comprising:
   (A) fibrous glass whose surfaces contain an initial coating of an organosilicon compound in which the organic group attached to the silicon atom contains an amino group, said organosilicon-coated fibrous glass containing thereover a second coating of a cured elastomer compound prepared from
      (1) a sulfur-curable elastomer containing less than 0.05 part of zinc oxide and less than 0.5 part of free fatty acids, per 100 parts of elastomer; and
      (2) a curing agent consisting essentially of up to 5 parts of sulfur and up to 3 parts of a vulcanization accelerator, per 100 parts of the sulfur-curable elastomer; and
   (B) A rubber in contact with the elastomer-coated fibrous glass of (A), said rubber having been substantially completely cured while in contact with the elastomer-coated fibrous glass of (A) utilizing suitable curing agents.

6. Fibrous glass-reinforced rubber according to claim 5 in which the organosilicon compound is selected from the group consisting of gamma-aminopropyl triethoxysilane, its corresponding silanol and its corresponding siloxane.

References Cited

UNITED STATES PATENTS

| 3,252,278 | 5/1966 | Marzocchi et al. | 117—126 X |
| 3,387,990 | 6/1968 | Marzocchi et al. | 117—126 X |
| 3,350,345 | 10/1967 | Vanderbilt et al. | 117—126 X |

WILLIAM D. MARTIN, Primary Examiner

D. COHEN, Assistant Examiner

U.S. Cl. X.R.

117—126